United States Patent [19]

Sugita

[11] Patent Number: 4,705,958
[45] Date of Patent: Nov. 10, 1987

[54] APPARATUS FOR READING AN ARBITRARILY ORIENTED IMAGE

[75] Inventor: Yasutoshi Sugita, Urayasu, Japan

[73] Assignee: Canon Kabushiki Kaisha, Tokyo, Japan

[21] Appl. No.: 726,827

[22] Filed: Apr. 24, 1985

[30] Foreign Application Priority Data

May 10, 1984 [JP] Japan .................................. 59-93613
May 15, 1984 [JP] Japan .................................. 59-97309
May 25, 1984 [JP] Japan ................................. 59-106713

[51] Int. Cl.⁴ .................... G03B 27/465; H04N 1/028
[52] U.S. Cl. ....................................... 250/578; 355/50; 358/293; 358/294
[58] Field of Search ............... 358/285, 293, 212, 213, 358/294, 213.11, 213.13, 213.23, 213.27; 250/578; 355/50, 53

[56] References Cited

U.S. PATENT DOCUMENTS 3,802,773 4/1974 Schneider .
3,833,762 9/1974 Gudmundsen ...................... 250/578

FOREIGN PATENT DOCUMENTS 0127462 7/1983 Japan ................................... 358/294

Primary Examiner—Edward P. Westin
Attorney, Agent, or Firm—Fitzpatrick, Cella, Harper & Scinto

[57] ABSTRACT

An image reading apparatus for reading an image of an original and converting it into an electrical signal, and particularly for reading the image by primary-scanning and secondary-scanning the image by a one-dimensional image sensor. This apparatus has one or two one-dimensional image sensors and is constructed such that the image reading state (for reading by the image sensors) differs when the image is placed in a vertically facing posture at an illuminating position compared to when the image is placed in a horizontally facing posture at the illuminating position, and can properly read the image and reproduce the same when the image is placed in any of these postures.

11 Claims, 13 Drawing Figures

APPARATUS FOR READING AN ARBITRARILY ORIENTED IMAGE

BACKGROUND OF THE INVENTION

1. Field of the Invention

This invention relates to an image reading apparatus for converting an image of an original into an electrical signal and reading the same. More particularly, it relates to an apparatus of the type which uses a one-dimensional image sensor such as a CCD (charge coupled device) or a photodiode array as image reading means and which reads the image by primary-scanning and secondary-scanning the image by the one-dimensional image sensor.

2. Description of the Prior Art

As a specific example of the image reading apparatus of this type, there is schematically shown in FIG. 4 of the accompanying drawings the construction of an apparatus for reading and processing any required frame image information in a roll of microfilm. Description will hereinafter be made with this apparatus taken as an example.

In FIG. 4, letter F designates a roll microfilm. The roll microfilm F is wound on a rewind reel 2 and the leader tape portion thereof is wound on a take-up reel 1 manually or by an auto-loading and automatic winding mechanism (not shown). The take-up reel 1 is rotatively driven clockwise by a motor M1 and the film F is successively taken up from the rewind reel 2 onto the take-up reel 1. The film movement in this direction is forward feeding a. The rewind reel 2 is rotatively driven counter-clockwise by a motor M2 and the film F is successively rewound from the take-up reel 1 onto the rewind reel 2. The film movement in this direction is reverse feeding b.

C designates individual frame images successively photographed and recorded on the surface of the film F along the length thereof, and m denotes frame counting marks formed at the edge positions of the film which correspond to those individual frame images.

Reference numeral 3 designates a film frame illuminating projection optical system disposed between the film rewind reel 2 and the film take-up reel 1 and comprising an illuminating lamp 4, a condenser lens 5, a mark detecting sensor unit 6, an imaging lens 7, etc. L denotes an optical axis, reference numeral 8 designates a film frame illuminating position, and C' denotes an imaging plane of the frame image C positioned at the illuminating position by the imaging lens 7.

Reference numeral 9 designates a one-dimensional image sensor such as a CCD image sensor or an MOS image sensor for primary-scanning and secondary-scanning the imaging plane C' and reading the formed image on the imaging plane C', i.e., the film frame information.

This one-dimensional image sensor 9 is mounted and held on a holding member 10 with the lengthwise direction thereof, which is the primary scanning direction, parallel to the horizontal direction X—X of the imaging plane C' (the forward and reverse feeding directions of the film F).

The holding member 10 is vertically slidable along a pair of left and right vertically extending guide rails 13, 13 disposed on a base bed 11 in parallelism to the vertical direction Y—Y of the imaging plane C' (the direction perpendicular to the forward and reverse feeding directions of the film F) through brackets 12, 12. Reference numerals 14 and 15 designate a driving pulley and a driven pulley, respectively, disposed on the lower portion and the upper portion, respectively, of the base bed 11, and reference numeral 16 denotes an endless wire passed over the pulleys 14 and 15. A part of the wire is connected to the laterally projected lug 10a of the holding member 10. The driving pulley 14 is rotatively driven in the forward and reverse directions by a reversible motor M3. By the driving pulley 14 being rotatively driven in the forward direction, the wire 16 is moved round counter-clockwise and the holding member 10 for the one-dimensional image sensor 9 is moved downwardly along the rails 13, 13. Conversely, by the driving pulley 14 being rotatively driven in the reverse direction, the holding member 10 is moved upwardly along the rails 13, 13. The holding member 10 is normally held at its home position in which it is raised up to the upper ends of the rails 13, 13. In this state, the one-dimensional image sensor 9 is positioned at or slightly above a position substantially coincident with the upper side edge of the imaging plane C'. With the downward movement of the holding member 10, the one-dimensional image sensor 9 is moved down from the upper side to the lower side of the imaging plane C' along the imaging plane C' with its light-receiving surface being just coincident with the imaging plane C'.

When a required film frame image number (address) is designated and input to a control circuit by means of an operating board (console), not shown, and a search key is depressed, the driving of the motor M2 or the motor M1 is started and the forward feeding a or the reverse feeding b of the film is effected, whereby the individual frame images C of the film F successively pass the frame image illuminating position 8 of the optical system 3 in the direction of forward feeding a or the direction of reverse feeding b. In the course of this passage, the marks m of the individual frame images C are successively photoelectrically read by the mark detecting sensor unit 6, and the successive reading signals of the marks m are counted (addition-counted or subtraction-counted) by the counter of a control circuitry, not shown, and the count content is compared with the aforementioned designated and input required frame image number by a comparing circuit. When the two contents are coincident with each other, that is, when the frame image corresponding to the designated and input required frame image number becomes positioned at the frame image illuminating position 8 of the optical system 3, a stop signal is produced from the comparing circuit to a drive control circuit and the forward feeding a or the reverse feeding b of the film F is immediately stopped. That is, the required frame image is automatically searched at the frame image illuminating position 8 of the optical system 3 and held in a stationary state, and the image of that frame image is formed as a stationary image at the position of the imaging plane C'.

On the other hand, when a reading command button is depressed after the termination of said automatic searching of the required frame image, the forward driving of the motor M3 is started and the holding member 10, namely, the one-dimensional image sensor 9 is moved downwardly from the upper side to the lower side of the imaging plane C'.

Thus, the formed image on the imaging plane C', i.e., the film frame image, is linearly primary-scanned in the image widthwise direction X—X by the primary scanning function along the length of the one-dimensional image sensor 9 and also is secondary-scanned by the downward movement of the sensor 9 along the image lengthwise direction Y—Y and is photoelectrically read as a time-serial electrical picture element signal by the sensor 9. The sensor 9 terminates its reading of the entire image by downwardly moving for secondary scanning to the lower side of the imaging plane C' and, at that point of time, the motor M3 changes to its reverse revolution driving, and by the upward movement of the holding member 10 resulting therefrom, the sensor 9 is returned to its initial home position which is adjacent to the upper side of the imaging plane, and stands by until the next image reading is started.

The time-serial electrical picture element signal as the image reading signal put out from the one-dimensional image sensor 9 is input to an image reproducing apparatus, not shown, and the reproduction of an image corresponding to the read image is effected by a CRT (cathode ray tube) display, a liquid crystal display or a printer (such as a laser beam printer or an ink jet printer) is effected.

Now, the microfilm F has its individual frame images C photographed and recorded thereon in a vertically facing mode as shown in FIG. 5A or 5C of the accompanying drawings or photographed and recorded thereon in a horizontally facing mode as shown in FIG. 5B or 5D of the accompanying drawings.

The aforedescribed image reading apparatus of FIG. 4 is for use with a roll of microfilm in the vertically facing image mode, and as long as the film F in use is in the vertically facing image mode, the primary scanning and secondary scanning reading of the frame images of the film by the one-dimensional image sensor 9 is effected from the top side of the frame to the bottom side and the image reproduction by a CRT display, a facsimile apparatus or a printer is effected in the vertically facing image mode without any problems, but where the film F in use is in the horizontally facing image mode, the primary scanning and secondary scanning reading of the frame images of that film by the one-dimensional image sensor 9 is effected with one side edge of the image as the top of the scanned area and with the other side edge of the image as the bottom. This has led to the following problems:

(1) The reproduced images on the CRT display or the printer face vertically and are very difficult to see; and (2) The primary scanning direction dimension (X—X direction dimension) W of the imaging plane C" of the frame image in the horizontally facing mode is great relative to the primary scanning length dimensional l (FIG. 3) of the one-dimensional image sensor 9 and therefore, the portions $\alpha_1$ and $\alpha_2$ of the imaging plane C" are outside the reading range of the one-dimensional image sensor 9 and in many cases, the reproduced image becomes imperfect at the top and bottom thereof and thus is inaccurate and useless.

SUMMARY OF THE INVENTION

It is an object of the present invention to provide an image reading apparatus which is free of the above-noted problems, i.e., an image reading apparatus for use in both modes which effects image reading so that both where the image to be read is in the vertically facing mode and where the image to be read is in the horizontally facing mode, the reproduced image on a CRT display, a printer or the like faces vertically with the top and bottom thereof being upside and downside, respectively, and has no image breakage.

The object of the present invention are achieved by providing an image reading apparatus of the type which reads the image of an original by primary-scanning and secondary-scanning the image by one-dimensional image sensors and which is provided with a first one-dimensional image sensor for effecting image recording with the horizontal direction X—X of the image as the primary scanning direction, a second one-dimensional image sensor for effecting image reading with the vertical direction Y—Y of the image as the primary scanning direction, and means for selectively changing over the first and second one-dimensional image sensors.

That is, (a) where the image to be read is in the vertically facing mode, the change-over is effected to the first one-dimensional image sensor and the image reading by this sensor is executed, and (b) where the image to be read is in the horizontally facing mode, the change-over is effected to the second one-dimensional image sensor and the image reading by this sensor is executed.

Another aspect of the present invention resides in an image reading apparatus constructed so that with respect to the image to be read, a one-dimensional image sensor and a secondary scanning moving mechanism therefore are changeable over to a first posture in which image reading is effected with the horizontal direction of the image as the primary scanning direction and with the vertical direction of the image as the secondary scanning direction and a second posture in which image reading is effected with the vertical direction of the image as the primary scanning direction and with the horizontal direction of the image as the secondary scanning direction.

That is, where the image to be read is in the vertically facing mode, the one-dimensional image sensor and the secondary scanning moving mechanism therefor are changed over to the first posture relative to the image and image reading is executed, and where the image to be read is in the horizontally facing mode, the one-dimensional image sensor and the secondary scanning moving mechanism therefor are changed over to the second posture and image reading is executed.

DESCRIPTION OF THE PREFERRED EMBODIMENTS

Figure 1:
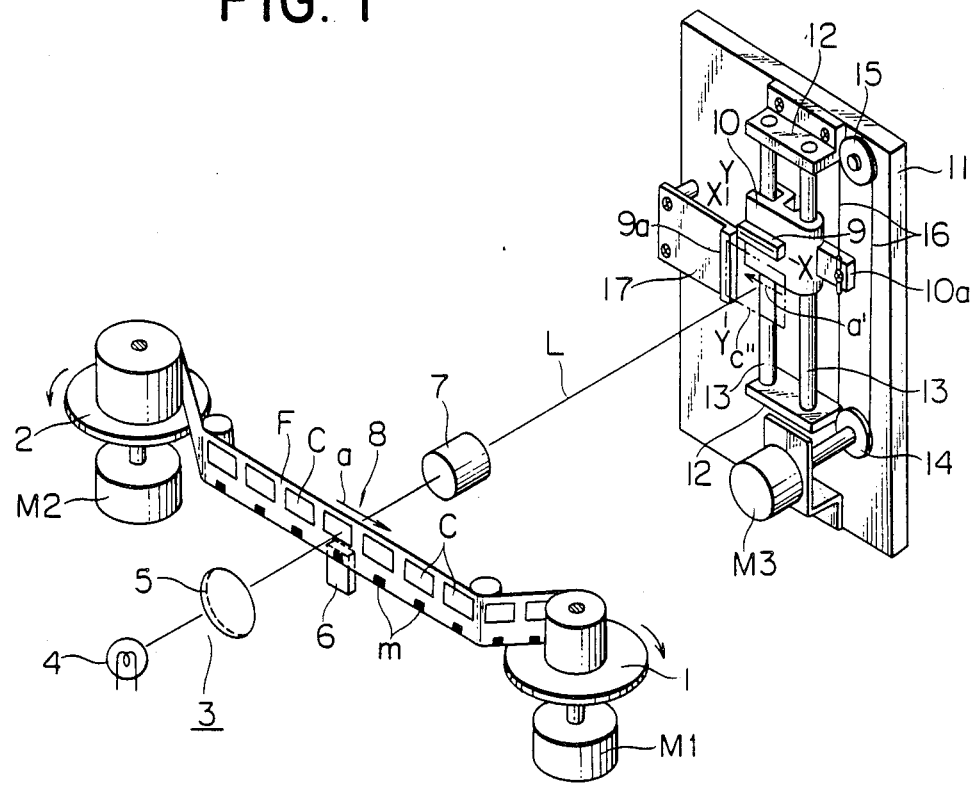
FIG. 1 is a perspective view showing the essential portions of a microfilm frame image reading apparatus constructed in accordance with the present invention.
Figure 3:
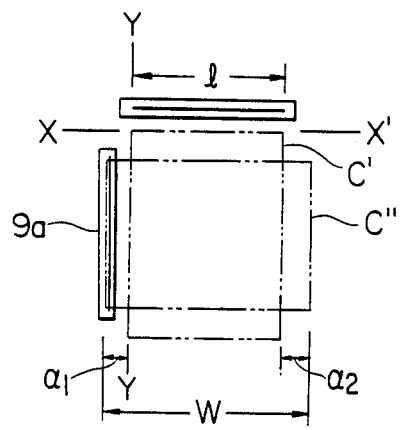
FIG. 3 shows the relations between first and second one-dimensional image sensors and a vertically facing image and a horizontally facing image.

The invention will hereinafter be described with respect to the preferred embodiments thereof, shown in the drawings.

Figure 4:
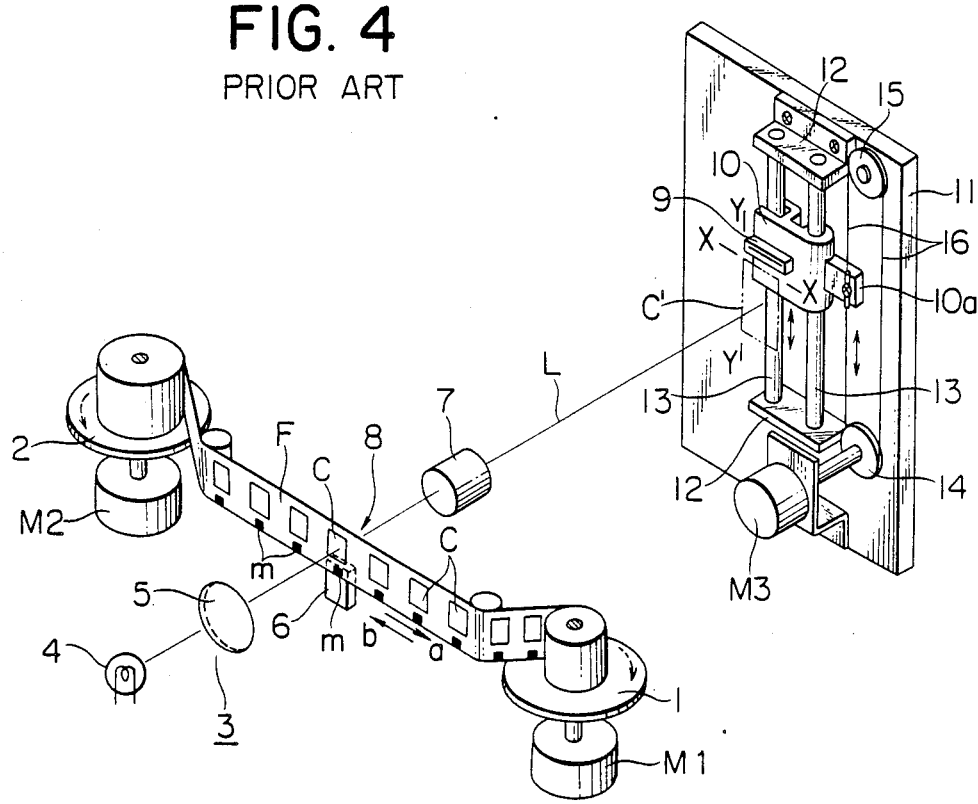
FIG. 4 is a perspective view showing the essential portions of an example of the microfilm frame image reading apparatus according to the prior art.
Figure 5A:
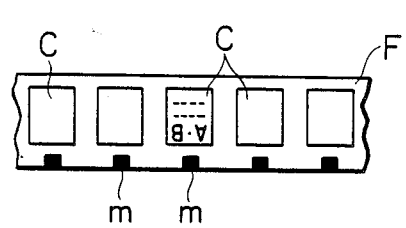
FIGS. 5A, 5B, 5C and 5D are fragmentary plan views of a roll microfilm and a microfiche film in the vertically facing image mode and the horizontally facing image mode.
Figure 5B:
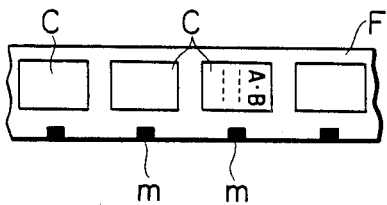
Figure 5C:
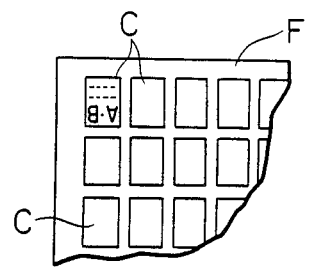
Figure 5D:
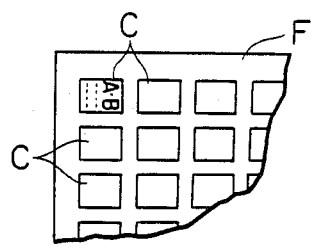

FIG. 1 shows an example which, with respect to the aforedescribed apparatus of FIG. 4, is provided with a first one-dimensional image sensor 9 for reading an image with the horizontal direction X—X (a first direction) of the image surface as the primary scanning direction and a second one-dimensional image sensor 9a for reading the image with the vertical direction Y—Y (a second direction) of the image surface as the primary scanning direction and can read and process both of microfilm frame images in the vertically facing image mode and microfilm frame images in the horizontally facing image mode without hindrance. In FIG. 1, members common to those in the apparatus of FIG. 4 are given common reference numerals and need not be described again.

The second one-dimensional image sensor 9a has its light-receiving surface positioned substantially at the upper left side of the imaging plane C" of the horizontally facing image by an imaging lens 7 as viewed in FIG. 1, and is immovably positioned and held relative to a base bed 11 through a holding member 17 with the lengthwise direction of the sensor, i.e., the primary scanning direction, being parallel to the vertical direction Y—Y of the image surface.

Figure 2:
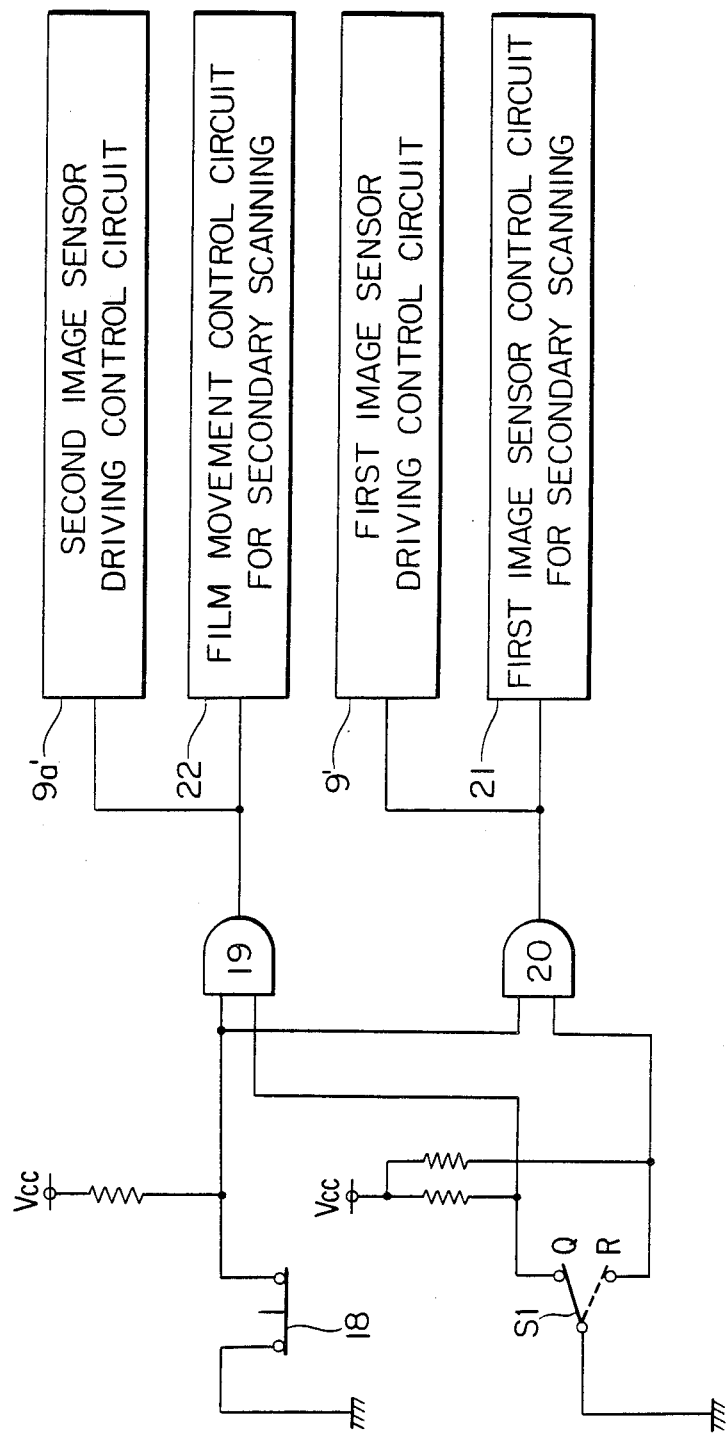
FIG. 2 diagrammatically shows a mode change-over circuit.

Referring to FIG. 2, which shows a mode changeover circuit, letter S designates a mode change-over switch, letter Q denotes a vertically facing image mode side contact, and letter R designates a horizontally facing image mode side contact. (a) The case of the vertically facing image mode (the image is vertically placed at an illuminating position).

The switch S is changed over to its contact Q side. A required film frame image is searched and positioned at the illuminating position 8, after which an image reading command push button 18 is depressed. Thereupon, an AND gate 20 opens, an image reading command signal is supplied to a first image sensor driving control circuit 9' and a first image sensor control circuit for secondary sensing 21 for the first one-dimensional image sensor 9, the first image sensor 9 is driven by said control circuit and a motor M3 is driven in the forward direction, whereby as described in connection with FIG. 4, the first one-dimensional image sensor 9 is moved for secondary scanning in the vertical direction Y—Y of the image surface and, with respect to a vertically facing image C', the image reading is executed by the primary scanning and the secondary scanning by the first one-dimensional image sensor 9.

(b) The case of the horizontally facing image mode (the image is horizontally placed at the illuminating position).

The switch S is changed over to its contact R side. A required film frame image is searched and positioned at the illuminating position 8, and then the image reading command push button 18 is depressed. Thereupon, an AND gate 19 opens, and image reading command signal is supplied to a second image sensor driving control circuit 9a' and a film movement control circuit for secondary scanning 22, the second image sensor 9a is driven by the control circuit and a motor M1 is driven, whereby a film F is fed in the forward direction a. This forward feeding a of the film F is effected by an amount corresponding to one frame in which the mark m of the next frame image is detected by a sensor unit 6. By this one-frame forward feeding of the film, the image of the film frame image to be read which has been formed by an imaging lens 7 is moved a' for secondary scanning relative to the second fixed one-dimensional image sensor 9a. Thus, with respect to the horizontally facing image C, the image reading is executed by the primary scanning by the second one-dimensional image sensor 9a and the movement a' for secondary scanning of the image surface C".

Thus, in either of the above-described cases (a) and (b), the CRT display based on the image reading signal of the first or second one-dimensional image sensor 9 or 9a and the reproduced image on the printer side face vertically and also, with respect to the horizontally facing image, reading and reproduction of the whole image which is perfect at top and bottom are effected.

The secondary scanning driving means for the first one-dimensional image sensor is not limited to the shown mechanism comprising pulleys and wire, but use may be made of one of other various driving mechanisms such as a rack-pinion mechanism and a reciprocally moving mechanism using a linear motor.

Also, the microfilm F may be a roll of microfilm, a microfiche film or a microstrip film, and the present invention can read and process the frame images of those films without hindrance both when they are placed vertically (a first posture) at the illuminating position and when they are placed horizontally (a second posture) at the illuminating position. The images to be read are not limited to microfilm frame images, but the present invention is also applicable to the reading of the images of originals such as documents and books.

Figure 6:
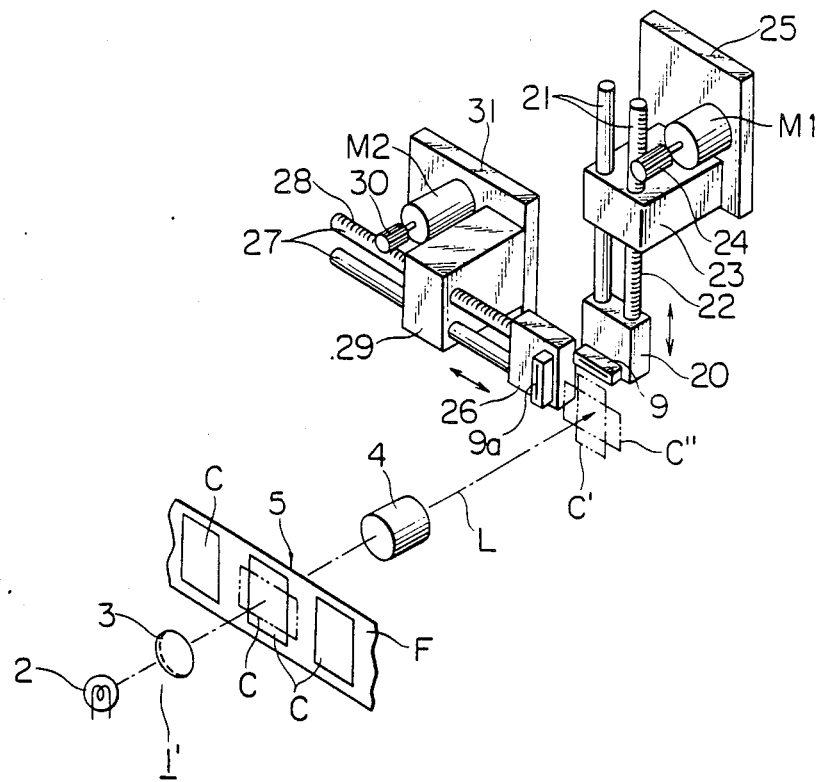
FIG. 6 is a perspective view showing another embodiment of the image reading apparatus according to the present invention.

FIG. 6 shows another embodiment of the present invention. In this embodiment, members similar to those in the previously described embodiment are given similar reference numerals. In the image reading apparatus of FIG. 6, reference numeral 20 designates a support member on which the first one-dimensional image sensor 9 is mounted. The support member 20 is mounted and supported on the lower ends of two sliding shafts 21 and 21 vertically slidable in a vertically sliding bearing block 23 mounted and supported on a fixed base bed 25. One sliding shaft 21 is formed with rack teeth 22 along the length thereof. M1 denotes a first reversible motor mounted and supported on the base bed 25, and reference numeral 24 designates a pinion mounted on the motor shaft of the motor M1. The pinion 24 is in mesh engagement with the rack teeth 22 of said sliding shaft. The first one-dimensional image sensor 9 is mounted on said support member 20 with the length thereof which is the primary scanning direction being parallel to the left to right direction X—X of image information surfaces C' and C". By the first reversible motor M1 being driven in the forward direction, the sensor support member 20, namely, the first one-dimensional image sensor 9 is moved downwardly for secondary scanning in the top to bottom direction Y—Y along the image information surfaces C' and C". When the first one-dimensional image sensor 9 reaches a predetermined terminus of movement for secondary scanning, the motor M1 revolves in the reverse direction and the member 20, namely, the first one-dimensional sensor 9, is moved up to its initial upper home position and stands by thereat.

Reference numeral 26 designates a support member on which the second one-dimensional image sensor 9a is mounted. This member 26 is mounted and supported on the right ends of two sliding shafts 27 and 27 slidable to the left and right in a horizontally sliding bearing block 29 mounted and supported on a fixed base bed 31. One sliding shaft 27 is formed with rack teeth 28 along the length thereof. M2 denotes a second reversible motor mounted and supported on the base bed 31, and reference numeral 30 designates a pinion mounted on the motor shaft of the motor M2. The pinion 30 is in mesh engagement with the rack teeth 28 of said sliding shaft. The second one-dimensional image sensor 9a is mounted on said support member 26 with the legth thereof which is the primary scanning direction being parallel to the top to bottom direction Y—Y of the image information surfaces C' and C". By the second reversible motor M2 being driven in the forward direction, the sensor support member 26, namely, the second one-dimensional image sensor 9a is moved for secondary scanning from left to right in the left to right direction X—X along the image information surfaces C' and C". When the second one-dimensional image sensor 9a reaches a predetermined terminus of movement for secondary scanning, the motor M2 revolves in the reverse direction and the member 26, namely, the second one-dimensional image sensor 9a, is returned to its initial left home position and stands by thereat.

Figure 7:
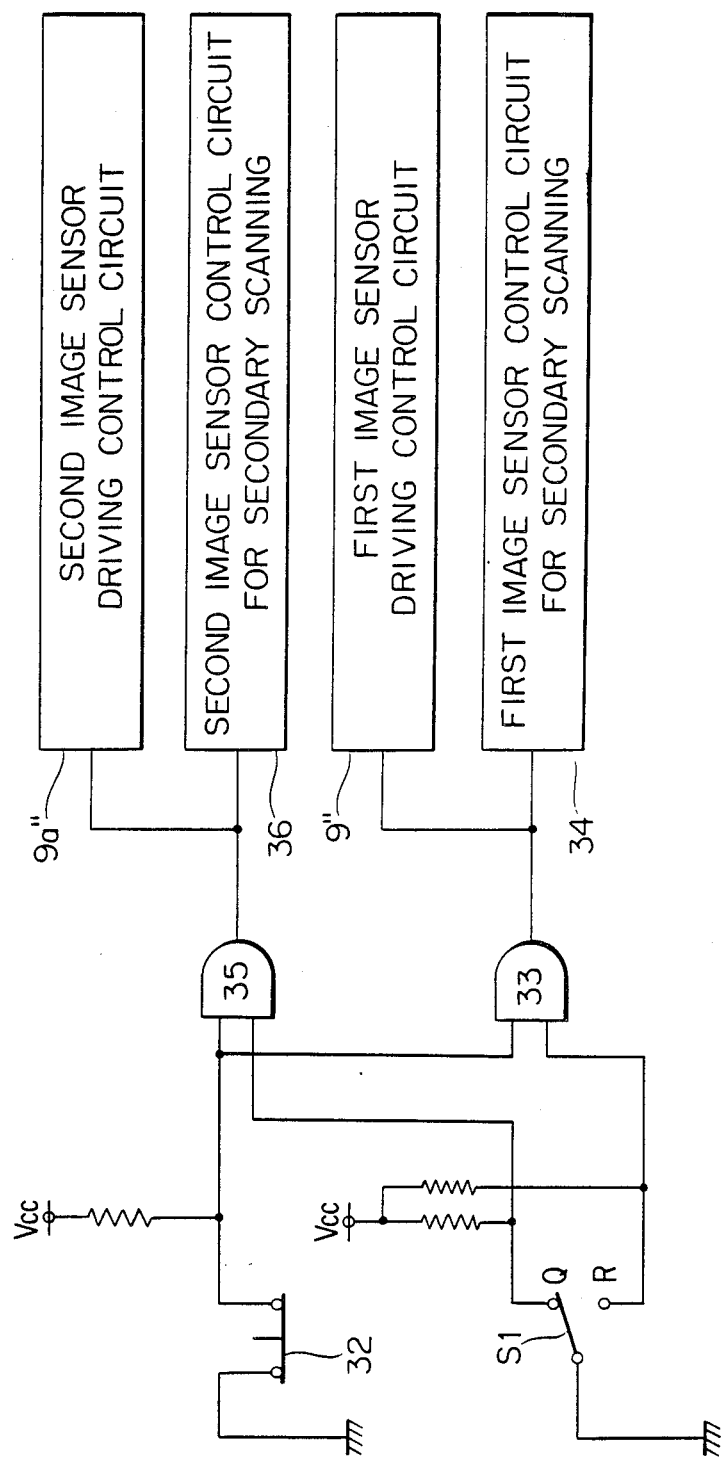
FIG. 7 diagrammatically shows the mode change-over circuit of the FIG. 6 apparatus.

Referring to FIG. 7, which shows a mode change-over circuit, S1 designates a mode change-over switch, Q denotes a vertically facing image mode side contact, and R designates a horizontally facing image mode side contact.

(a) The case of the vertically facing image mode

The switch S1 is changed over to its contact Q side. A required film frame image is searched and positioned at an illuminating position 5, and an image reading command push button 32 is depressed (the change-over of the switch S1 to its contact Q side or its contact R side may take place after searching of the required frame image). Thereupon, an AND gate 33 opens, an image reading command signal is supplied to an image sensor driving control circuit 9a" for the first one-dimensional image sensor 9 and a first image sensor control circuit for secondary scanning 34, the first image sensor 9 is driven by this control circuit and the first motor M1 is driven in the forward direction, whereby the first one-dimensional image sensor 9 is moved for secondary scanning in the top to bottom direction Y—Y of the image surface and, with respect to the vertically facing image C', the image reading is executed by the primary scanning and the secondary scanning by the first one-dimensional image sensor 9.

(b) The case of the horizontally facing image mode

The switch S1 is changed over to its contact R side. A required film frame image is searched and positioned at the illuminating position, and the image reading command push button 32 is depressed. Thereupon, an AND gate 35 opens, an image reading command signal is supplied to an image sensor driving control circuit 9a" for the second one-dimensional image sensor 9a and a second image sensor control circuit for secondary scanning 36, the second image sensor 9a is driven by this circuit and the second motor M2 is driven in the forward direction, whereby the second one-dimensional image sensor 9a is moved for secondary scanning in the left to right direction X—X of the image surface and, with respect to the horizontally facing image C", the image reading is executed by the primary scanning and the secondary scanning by the second one-dimensional image sensor 9a.

Figure 8:
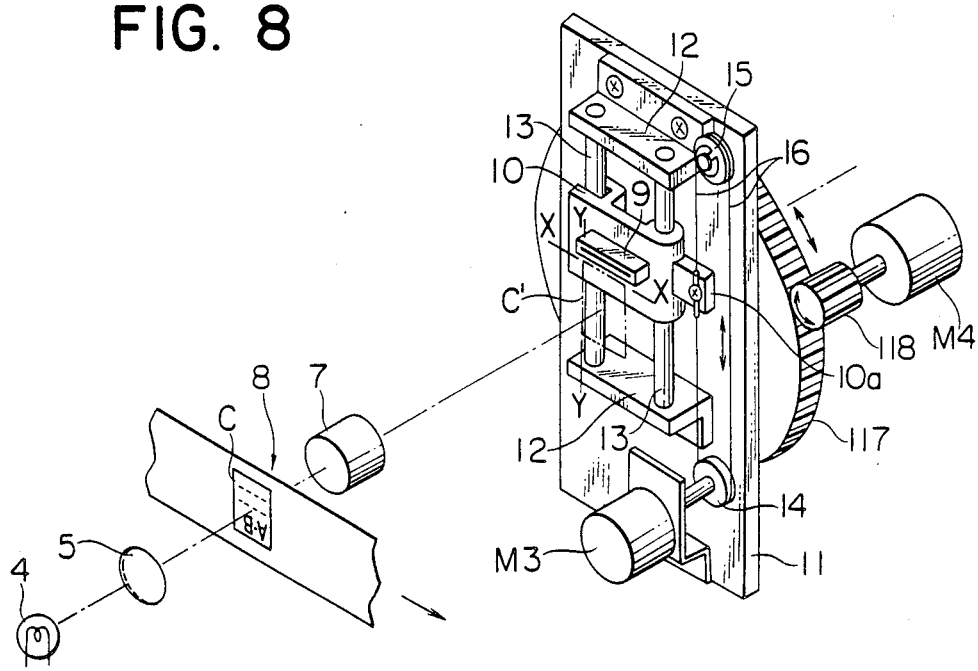
FIGS. 8 and 9 are perspective views showing still another embodiment of the image reading apparatus according to the present invention.
Figure 9:
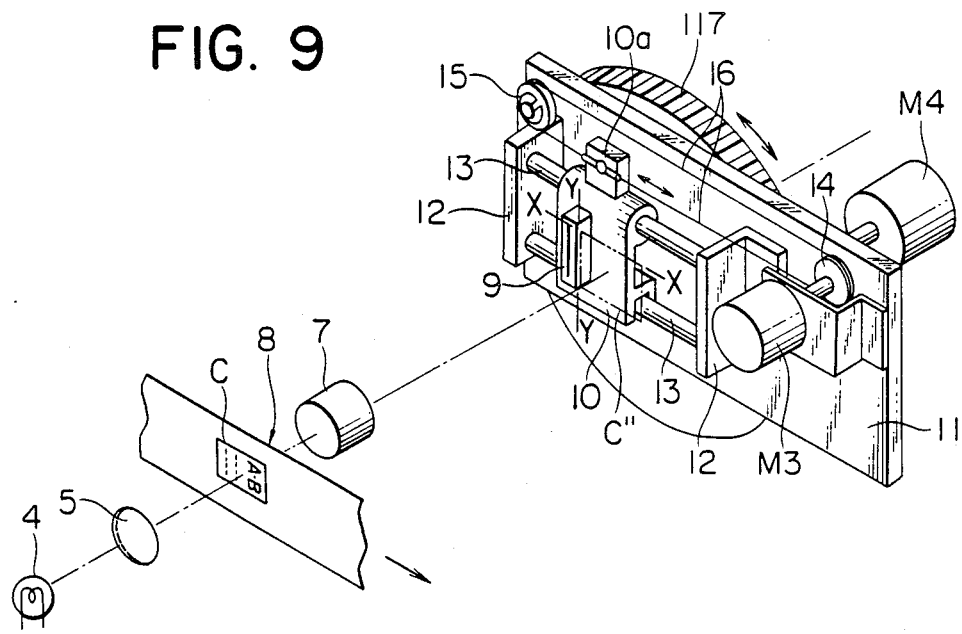
Figure 10:
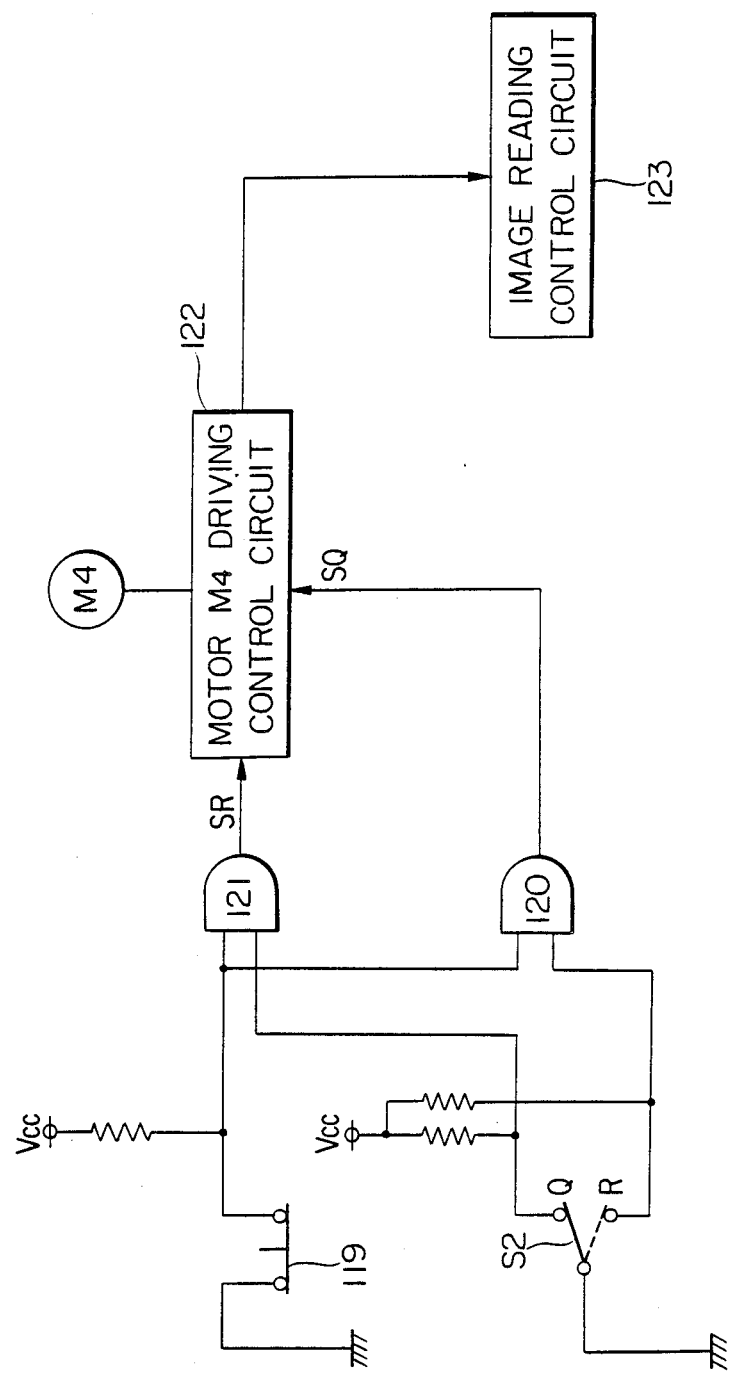
FIG. 10 diagrammatically shows the mode change-over circuit of the FIG. 8 apparatus.

FIGS. 8 to 10 show still another embodiment of the present invention. In this embodiment, only one one-dimensional image sensor is provided and the reading of the images of the two modes is effected by the single image sensor. In FIG. 8, a base bed 11 on which the one-dimensional image sensor 9 and the secondary scanning moving mechanism 10, 12-16 M3 therefor are assembled and held is supported for rotation about a support shaft (not shown) coaxial with the optic axis L of an optical system 3 in a plane parallel to the film frame image imaging surfaces C', C". Reference numeral 117 designates a gear mounted on the back of the base bed 11 concentrically with the support shaft, and reference numeral 118 denotes a pinion rotatively driven by a reversible motor M4. The pinion 118 is in mesh engagement with the gear 117. By the motor M4 being driven in the reverse direction, the base bed 11 is rotated counterclockwise about the support shaft through the intermediary of the pinion 118 and the gear 117 and is changed from its vertically facing posture of FIG. 8 to its horizontally facing posture of FIG. 9. Also, in the horizontally facing posture of FIG. 9, the motor M4 is driven in the forward direction, whereby the base bed is returned to its vertically facing position of FIG. 8.

In the vertically facing posture of FIG. 8 of the base bed, the one-dimensional image sensor 9 and the secondary scanning moving mechanism therefor assembled and held on the base bed 11 are in a first posture with respect to the image surfaces (imaging planes) C' and C", i.e., the same posture as that of the apparatus of FIG. 4 in which the horizontal direction X—X of the image surfaces is the primary scanning direction and the vertical direction Y—Y of the image surfaces is the secondary scanning direction.

In the horizontally facing posture of FIG. 9 of the base bed, the one-dimensional image sensor 9 and the secondary scanning moving mechanism therefor are in a second posture with respect to the image surfaces C' and C", i.e., a posture in which the vertical direction Y—Y of the image surfaces is the primary scanning direction and the horizontal direction X—X of the image surfaces is the secondary scanning direction.

Referring to FIG. 10 which shows a mode change-over circuit, reference numeral 119 designates an image reading command push button, S2 denotes a mode change-over switch, Q designates the vertically facing image mode side contact of the switch S2, and R denotes the horizontally facing image mode side contact of the switch S2.

(a) The case of the vertically facing image mode (FIG. 8)

The switch S2 is changed over to its contact Q side. A required film frame image C is searched and positioned vertically (the first posture) at an illuminating position 8. The push button 119 is depressed. The change-over of the switch S2 to its contact Q side may take place after the searching of the required frame image.

Thereupon, an AND gate 120 opens and a motor forward revolution command signal SQ is input to the forward-reverse revolution driving control circuit 122 of the motor M4. If, at this time, the base bed 11 is already in its vertically facing posture of FIG. 8, that is, the one-dimensional image sensor 9 is in the first posture relative to the vertically facing image surface C', the forward revolution driving of the motor M4 is not effected irrespective of said signal SQ and the base bed 11 remains in its vertically facing posture and subsequently, an image reading control circuit 123 operates and with respect to the vertically facing image surface C', a reading process in which the horizontal direction X—X of the image surface C' is the primary scanning direction and the vertical direction Y—Y of the image surface C' is the secondary scanning direction is executed by the one-dimensional image sensor 9.

Also, if the base bed 11 is in its horizontally facing posture of FIG. 9 at the point of time whereat the push button 119 has been depressed, the forward revolution driving of the motor M4 is effected by the signal SQ, whereby the base bed 11 is rotated clockwise. At a point of time whereat the base bed 11 has been rotated by 90° and changed to its vertically facing posture of FIG. 8, any further rotation of the base bed 11 by the motor M4 is stopped. Thereafter, the image reading control circuit 123 operates and the same reading process as that described above is executed.

(b) The case of the horizontally facing image mode (FIG. 9)

The switch S2 is changed over to its contact R side. A required film frame image is searched and positioned horizontally (the second posture) at the illuminating position. The push button 119 is depressed.

Thereupon, an AND gate 121 opens and a motor reverse revolution command signal SR is input to the control circuit 122 of the motor M4. If, at this time, the base bed 11 is already in its horizontally facing posture of FIG. 9, that is, the one-dimensional image sensor 9 is in the second posture relative to the horizontally facing image surface C', the reverse revolution driving of the motor M4 is not effected irrespective of said signal SR and the base bed 11 remains in its horizontally facing posture and subsequently, the image reading control circuit 123 operates and, with respect to the horizontally facing image surface C'', a reading process in which the vertical direction Y—Y of the image surface C'' is the primary scanning direction and the horizontal direction X—X of the image surface C'' is the secondary scanning direction is effected by the one-dimensional image sensor 9.

Also, if the base bed 11 is in its vertically facing posture of FIG. 8 at the point of time whereat the push button 119 has been depressed, the reverse revolution driving of the motor M4 is effected by the signal SR, whereby the base bed 11 is rotated counter-clokwise. At a point of time whereat the base bed 11 has been rotated by 90° and changed to its horizontally facing posture of FIG. 9, any further rotation of the base bed 11 by the motor M4 is stopped. Thereafter, the image reading control circuit 123 operates and the same reading process as that described above is executed.

The mechanism for changing over the vertically facing posture and the horizontally facing posture of the base bed 11, that is, changing over the first and second posture of the one-dimensional image sensor 9 and the secondary scanning moving mechanism therefor relative to the image surfaces C' and C'', may also be constructed of a reciprocally moving mechanism using an electromagnetic solenoid and a linear motor. Alternatively, the change-over may be manually effected.

What is claimed is:

1. An image reading apparatus for reading an image to convert said image into an electrical signal, comprising:
   a first image sensor having a light receiving element rectilinearly arranged in a first direction;
   a second image sensor having a light receiving element rectilinearly arranged in a second direction perpendicular to said first direction;
   scanning means for relatively moving each said image sensor with respect to the image; and
   selecting means for selecting either one of said first and second image sensors in accordance with whether the image is vertical or horizontal, and the selected one of said selected image sensors reading the image.

2. An image reading apparatus according to claim 1, wherein said scanning means has first moving means for moving said first image sensor in said second direction and second moving means for moving said image in said first direction.

3. An image reading apparatus according to claim 2, wherein said first image sensor is mounted on a movable first holding member and said second image sensor is mounted on an unmovable second holding member, said first holding member being driven by said first moving means.

4. An image reading apparatus according to claim 1, further comprising optical means for image-forming an image on each image sensor.

5. An image reading apparatus according to claim 1, wherein said scanning means has first moving means for moving said first image sensor in said second direction and second moving means for moving said second image sensor in said first direction.

6. An image reading apparatus according to claim 1, wherein the image is recorded on a microfilm.

7. An image reading apparatus for reading an image to convert the image into an electrical signal, comprising:
   an image sensor having a light receiving element rectilinearly arranged;
   drive means for moving said image sensor in a predetermined direction;
   a holding member for holding said image sensor and said driving means; and
   rotating means for rotating said holding member between a first predetermined position and a second predetermined position in accordance with whether the image is vertical or horizontal.

8. An image reading apparatus according to claim 7, further comprising optical means for image-forming an image on said image sensor, wherein said rotating means rotates said holding member about an axis parallel to an optical axis of said optical means.

9. An image reading apparatus, comprising:
   image pick-up means for receiving a light from an image to generate an electrical signal corresponding to the image;
   drive means for moving said image pick-up means in a predetermined direction;
   holding means for holding said image pick-up means; and
   rotating means for rotating said image pick-up means by at least 90° in accordance with whether the image is perpendicular or horizontal.

10. An image reading apparatus according to claim 9, wherein said drive means is mounted on said holding member and is rotatable together with said holding member.

11. An image reading apparatus comprising:
image pick-up means for receiving light from an image to generate an electrical signal corresponding to the image;
optical means for image-forming the image on said image pick-up means;
rotating means for relatively rotating said image pick-up means with respect to the image about an axis parallel to an optical axis of said optical means;
signal generating means for generating a signal of whether the image placed at a predetermined position is vertical or horizontal; and
rotation control means for driving said rotating means on the basis of the signal from said signal generating means such that the image formed on said image pick-up means is directed in a determined direction with respect to said image pick-up means.

* * * * *